(12) United States Patent
Tanaka et al.

(10) Patent No.: US 8,291,339 B2
(45) Date of Patent: Oct. 16, 2012

(54) COMPUTER-READABLE RECORDING MEDIUM STORING DISPLAY CONTROL PROGRAM, AND DISPLAY CONTROL DEVICE

(75) Inventors: Yoshihisa Tanaka, Osaka (JP); Junko Itou, Osaka (JP)

(73) Assignee: Kyocera Mita Corporation (JP)

( * ) Notice: Subject to any disclaimer, the term of this patent is extended or adjusted under 35 U.S.C. 154(b) by 831 days.

(21) Appl. No.: 11/964,760

(22) Filed: Dec. 27, 2007

(65) Prior Publication Data

US 2008/0163058 A1    Jul. 3, 2008

(30) Foreign Application Priority Data

Dec. 27, 2006    (JP) ................. 2006-352805

(51) Int. Cl.
*G06F 3/048*    (2006.01)
(52) U.S. Cl. ......... 715/778; 715/802; 715/768; 715/769
(58) Field of Classification Search ................... 715/714, 715/715, 716, 717, 718, 804, 805, 822, 778
See application file for complete search history.

(56) References Cited

U.S. PATENT DOCUMENTS

| | | | | |
|---|---|---|---|---|
| 6,011,537 | A * | 1/2000 | Slotznick | 715/733 |
| 6,028,600 | A * | 2/2000 | Rosin et al. | 715/718 |
| 6,151,611 | A * | 11/2000 | Siegel | 715/224 |
| 6,208,345 | B1 * | 3/2001 | Sheard et al. | 715/853 |
| 7,024,433 | B2 * | 4/2006 | Arai et al. | 1/1 |
| 7,040,530 | B2 * | 5/2006 | Watanabe et al. | 235/375 |
| 7,237,186 | B2 * | 6/2007 | Androski et al. | 715/217 |
| 7,503,012 | B2 * | 3/2009 | Chen et al. | 715/769 |
| 7,703,041 | B2 * | 4/2010 | Ito et al. | 715/804 |
| 7,823,067 | B2 * | 10/2010 | Grasland et al. | 715/719 |
| 2001/0012022 | A1 * | 8/2001 | Smith | 345/768 |
| 2002/0073123 | A1 * | 6/2002 | Tsai | 707/526 |
| 2002/0078467 | A1 * | 6/2002 | Rosin et al. | 725/110 |
| 2002/0145621 | A1 * | 10/2002 | Nguyen | 345/718 |
| 2002/0171682 | A1 * | 11/2002 | Frank et al. | 345/790 |
| 2003/0051209 | A1 * | 3/2003 | Androski et al. | 715/503 |
| 2003/0097642 | A1 * | 5/2003 | Arai et al. | 716/1 |
| 2003/0160829 | A1 * | 8/2003 | Miksovsky et al. | 345/804 |
| 2003/0161670 | A1 * | 8/2003 | Watanabe et al. | 400/61 |
| 2006/0129933 | A1 * | 6/2006 | Land et al. | 715/723 |
| 2007/0052687 | A1 * | 3/2007 | Terada | 345/173 |
| 2007/0086752 | A1 * | 4/2007 | Ando et al. | 386/124 |
| 2007/0094587 | A1 * | 4/2007 | Ando et al. | 715/500.1 |

(Continued)

FOREIGN PATENT DOCUMENTS

JP    2003-316536    11/2003

(Continued)

*Primary Examiner* — Michael Roswell
*Assistant Examiner* — William Titcomb
(74) *Attorney, Agent, or Firm* — Gerald E. Hespos; Michael J. Porco

(57) ABSTRACT

An electronic equipment has a display that can display a plurality of screens and a display controller that can switch displays of the screens. The display and the controller enable an operator to change a set value of at least one item. A setting change receiver can receive from the operator an instruction of changing a set value of each item in a currently displayed screen when the display controller allows the display portion to display one of the screens. The display controller allows a display part of the item whose set value is changed most recently in the screen whose set value is changed to be displayed transmissively on a subsequently displayed screen when the currently displayed screen is switched to the subsequently displayed screen.

19 Claims, 14 Drawing Sheets

U.S. PATENT DOCUMENTS

| | | | |
|---|---|---|---|
| 2007/0101290 A1* | 5/2007 | Nakashima et al. | 715/797 |
| 2007/0172201 A1* | 7/2007 | Ando et al. | 386/95 |
| 2007/0172213 A1* | 7/2007 | Ando et al. | 386/125 |
| 2007/0177848 A1* | 8/2007 | Ando et al. | 386/95 |
| 2007/0180395 A1 | 8/2007 | Yamashita et al. | |
| 2007/0180396 A1* | 8/2007 | Yajima et al. | 715/778 |
| 2007/0196073 A1* | 8/2007 | Ando et al. | 386/46 |
| 2007/0206924 A1* | 9/2007 | Ando et al. | 386/95 |
| 2008/0007659 A1* | 1/2008 | Yoshida et al. | 348/734 |
| 2008/0139116 A1* | 6/2008 | Balgard et al. | 455/41.2 |
| 2009/0024958 A1* | 1/2009 | Itou | 715/805 |

FOREIGN PATENT DOCUMENTS

| | | |
|---|---|---|
| WO | 2005098588 A1 | 10/2005 |

* cited by examiner

FIG.3

| | A | B | C | D | E | F | G | N | O | P | Q |
|---|---|---|---|---|---|---|---|---|---|---|---|
| 1 | 200 | | | | 898 | | | | | | |
| 2 | 564 | | 765 | | 565 | | | | | | |
| 3 | 775 | | 211 | | 232 | | | | | | |
| 4 | 709 | | 366 | | 709 | | | | | | |
| 5 | 456 | | 455 | | 452 | | | | | | |
| 6 | 123 | | 987 | | 707 | | | | | | |
| 7 | 555 | | 568 | | 89898 | | | | | | |
| 8 | 888 | | 753 | | 4545 | | | | | | |
| 9 | 965 | | 888 | | 3 | | | | | | |
| 10 | 788 | | 966 | | | | | | | | |
| 11 | | | 234 | | | | | | | | |
| 12 | | | 884 | | | | | | | | |
| 13 | | | | | | | | | | | |
| 14 | | | | | | | | | | | |
| 15 | | | | | | | | 788 | | | |
| 16 | | | | | | | | 855 | | | |
| 17 | | | | | | | | 564 | | | |
| 18 | | | | | | | | 421 | | | |
| 19 | | | | | | | | 115 | | | |
| 20 | | | | | | | | 330 | | | |
| 21 | | | | | | | | 640 | | | |
| 22 | | | | | | | | 117 | | | |

Sheet1 / Sheet2 / Sheet3

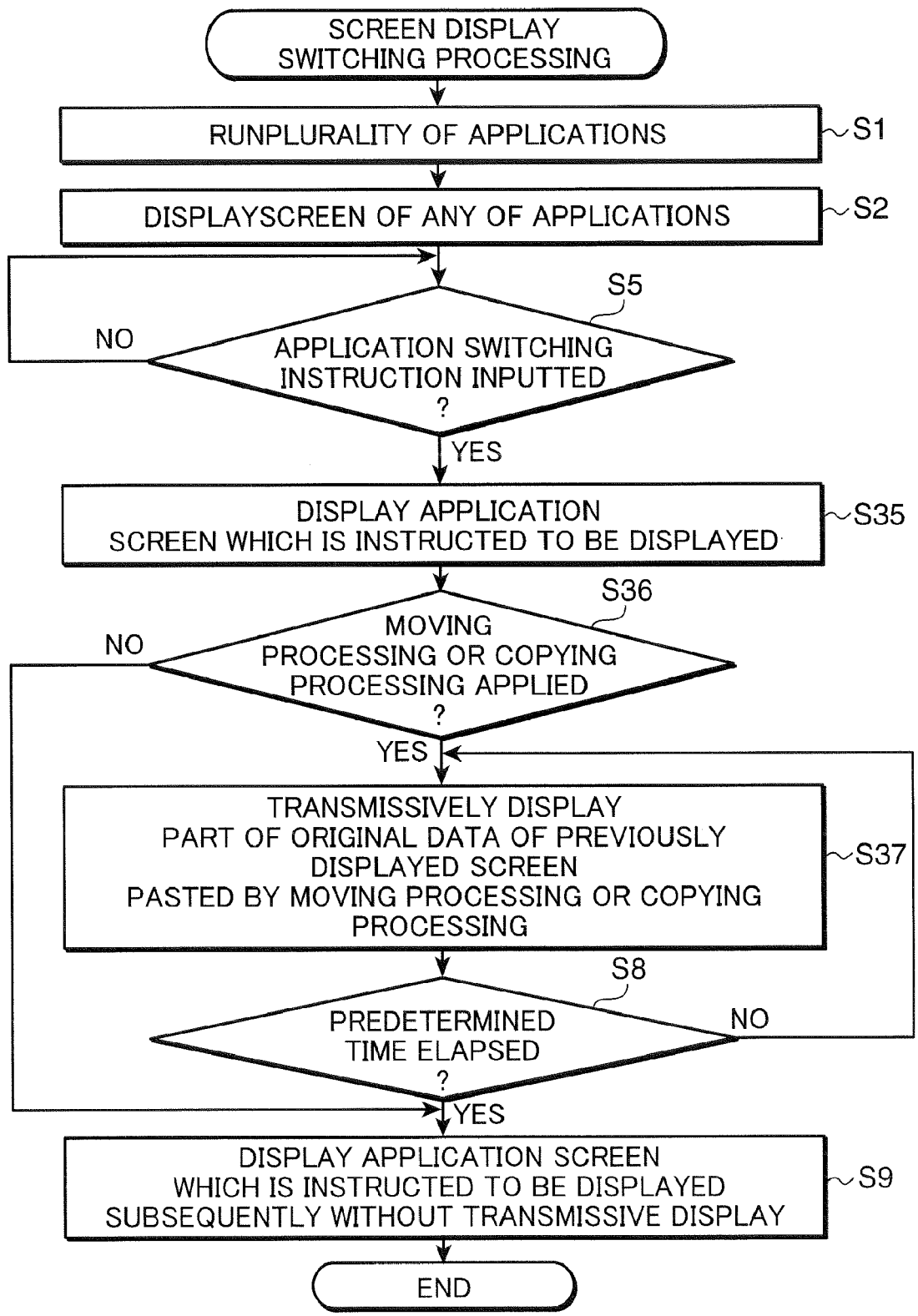

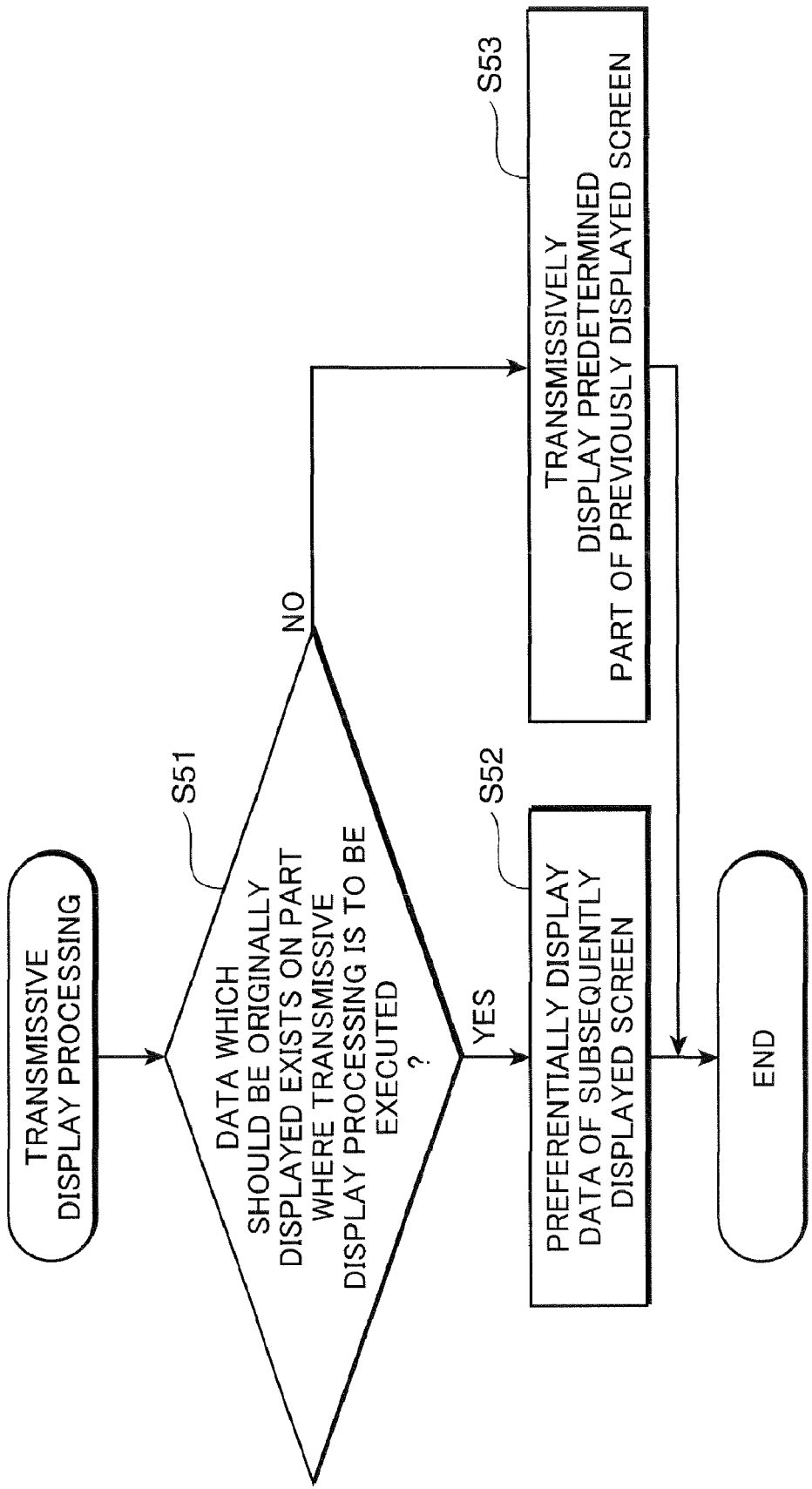

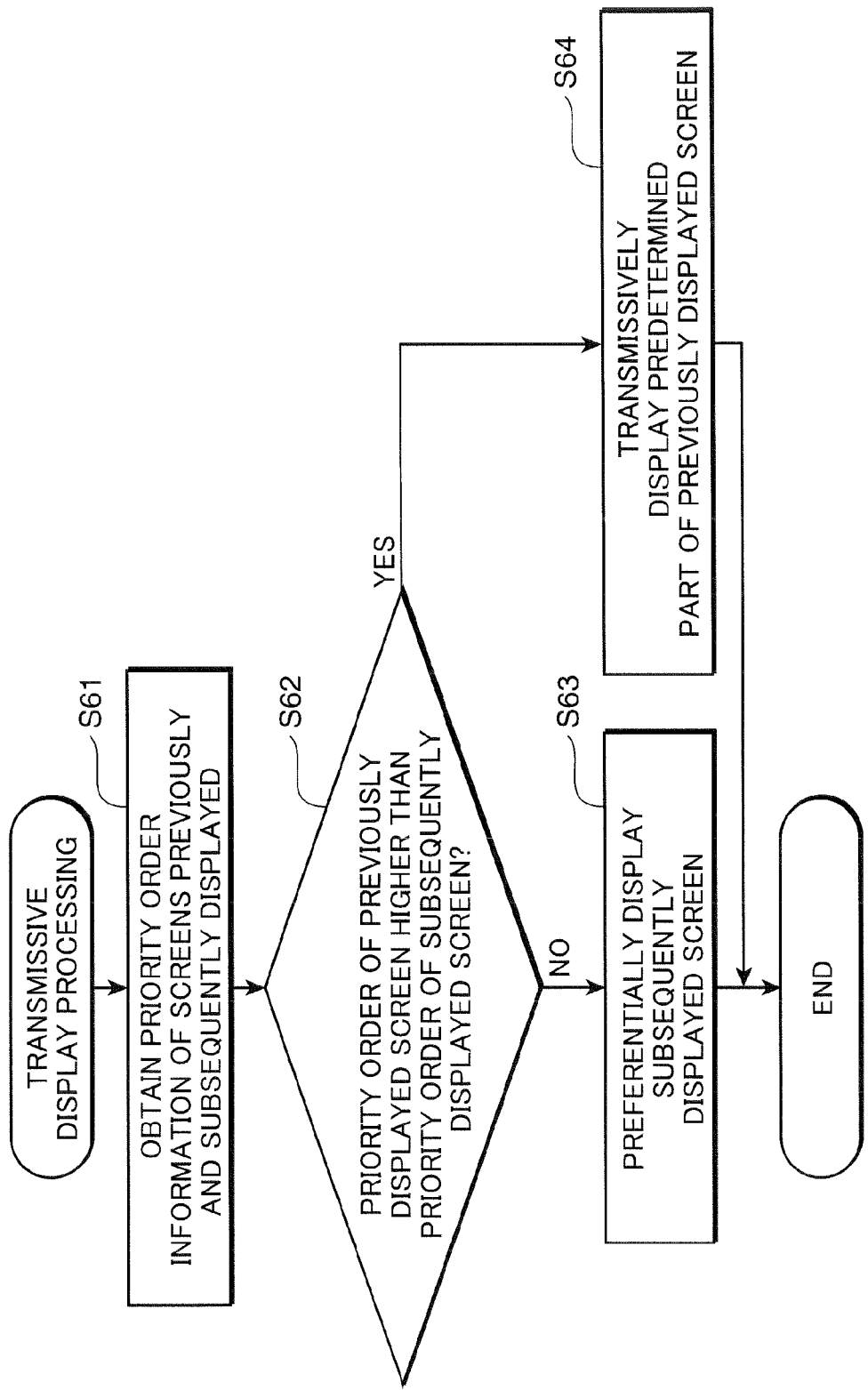

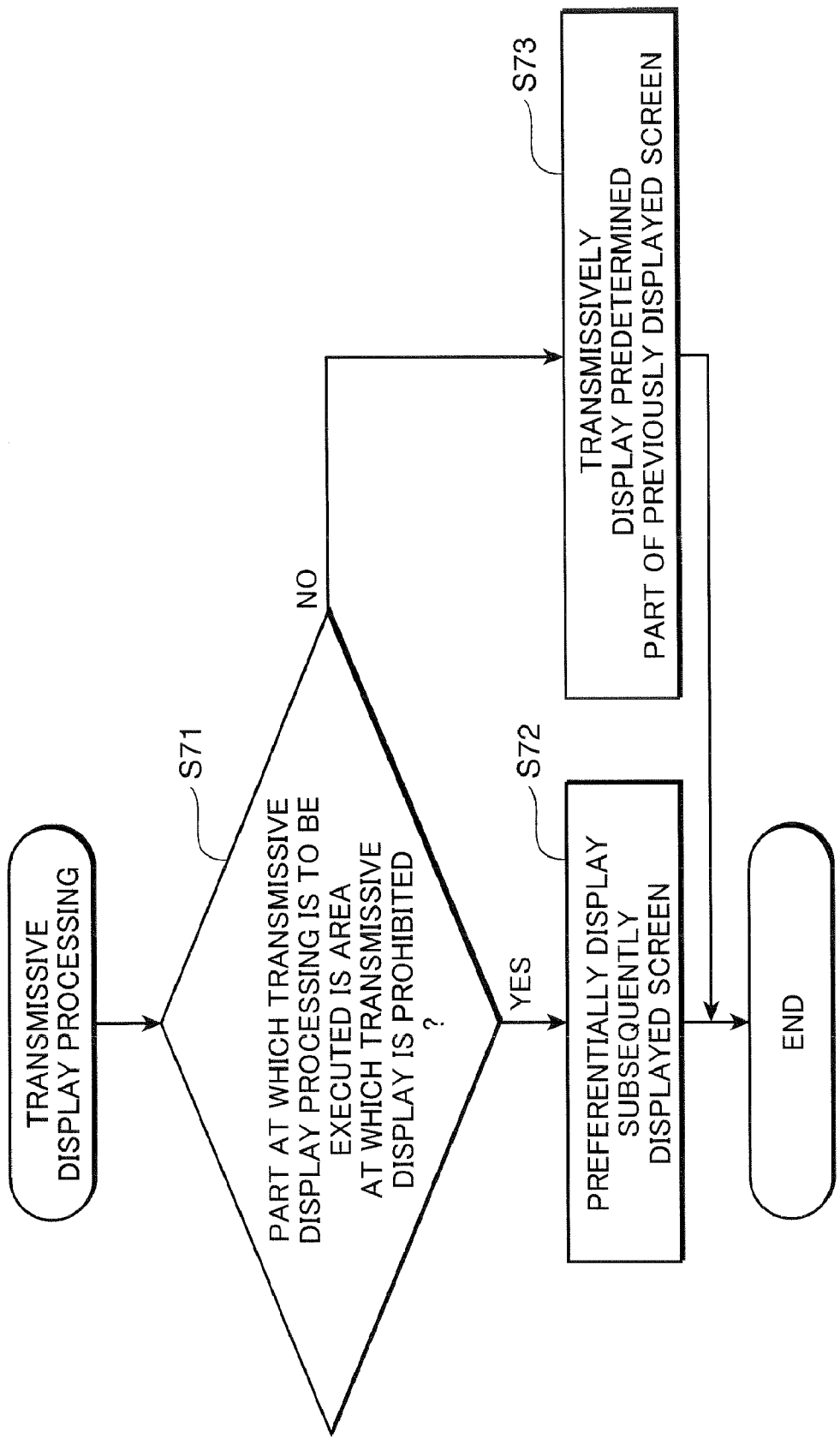

COMPUTER-READABLE RECORDING MEDIUM STORING DISPLAY CONTROL PROGRAM, AND DISPLAY CONTROL DEVICE

BACKGROUND OF THE INVENTION

1. Field of the Invention

The present invention relates to a computer-readable recording medium storing a display control program, and a display control device. More particularly, it relates to a technology of allowing a display device to sequentially switch displays of a plurality of screens.

2. Description of the Related Art

Conventionally, a technology of allowing a plurality of applications to run concurrently and allowing a display to switch displays of screens of the plurality of applications sequentially have been adopted in a personal computer and the like. Further, there has been proposed a technology of display which allows an operator to easily perform an operation and data processing. As an example of adopting this technology, there exists a file data print output method disclosed in Japanese Patent Unexamined Publication 2003-316536. According to this file data print output method, when file data which is edited with an application software on a personal computer is outputted to an image forming apparatus, a second printer icon 202 including portions 202A-202H respectively showing optional functions of the image forming apparatus is pulled down from a first printer icon 201 displayed on a task bar of a monitor screen. If the operator clicks any one of the pull-down displays with a pointer, the personal computer outputs file data being currently under edition and an execution instruction of a function corresponding to an instructed part to the image forming apparatus.

Generally, when screens of a plurality of applications are displayed on a display, and an operator switches a currently displayed application screen to another application screen to perform an operation, the operator cannot confirm data displayed on a previously displayed application screen after the screen is switched to another application screen. In other words, after the display is switched, the subsequently displayed application screen is so displayed as to overlap on the previously displayed application screen. Accordingly, the operator cannot visually confirm on the display the data previously displayed on the application screen. Therefore, if the operator would like to confirm the data of the previously displayed application screen, he it would be necessary to perform an operation of switching the display to allow the original application screen to be displayed on the display. According to the file data print output method disclosed in the above-described patent document 1, functions of the image forming apparatus can be easily and assuredly selected. However, it does not solve a problem that it is inconvenient in confirming and handling of data on each screen at the time of switching the display screen.

SUMMARY OF THE INVENTION

The present invention was made in aim of solving the above-described problems, and its object is to make it easier to confirm and handle data on each screen when displays of a plurality of screens are switched sequentially on a display portion such as a display.

These and other objects, features and advantages of the present invention will become more apparent upon reading of the following detailed description along with the accompanied drawings.

BRIEF DESCRIPTION OF THE DRAWINGS

FIG. 3 shows an example of a screen display of a display portion.

FIGS. 8A, 8B, and 8C show examples of a screen display of the display portion.

FIG. 10 is a flowchart showing a fifth embodiment of the display switching processing.

FIG. 12 is a flowchart showing a second embodiment of a transmissive display processing.

FIG. 13 is a flowchart showing a third embodiment of the transmissive display processing.

FIG. 14 is a flowchart showing a fourth embodiment of the transmissive display processing.

DETAILED DESCRIPTION OF THE PREFERRED EMBODIMENTS

Figure 1:
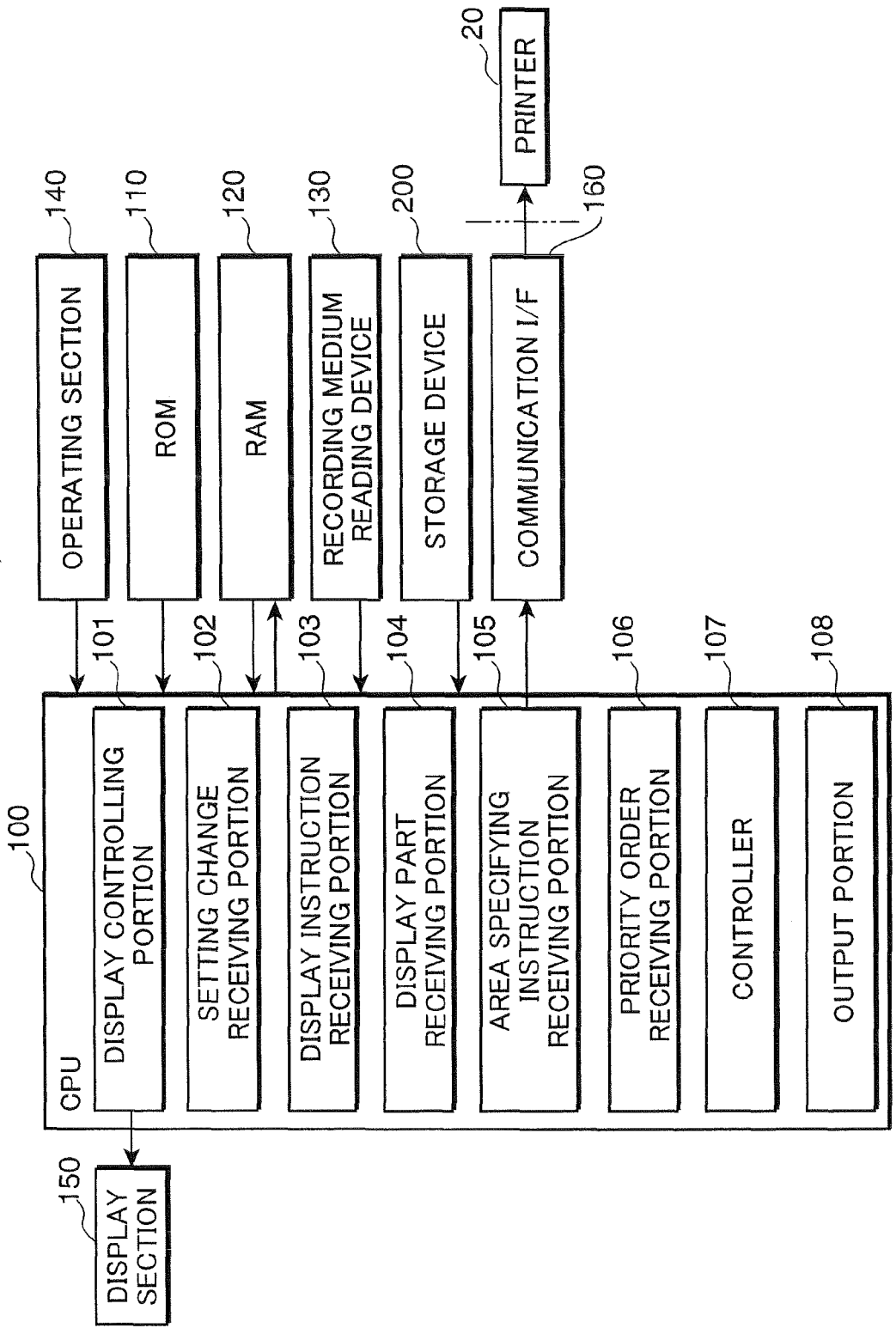
FIG. 1 is a block diagram showing a schematic configuration of a personal computer (hereinafter, referred to as PC) in which a display control program in accordance with an embodiment of the present invention is installed.

Hereinafter, embodiments of a display control program, a display device, and a display control method in accordance with the present invention will be described with reference to the drawings. FIG. 1 is a block diagram showing a schematic configuration of a personal computer (an embodiment of an electronic equipment in accordance with the present invention, and it is referred to as PC hereinafter) in which a display control program in accordance with an embodiment of the present invention is installed.

A PC 1 is connected to a printer 20 through a parallel cable such as a Centronics interface, a LAN (Local Area Network) cable, or a serial cable such as an RS-232C, and print data outputted from the PC 1 is printed on a recording sheet by the printer 20. A communication I/F 160 serves as a LAN interface, a parallel I/F portion, or a serial I/F portion. The printer 20 is not limited to a printer but may include various apparatuses having a printer function such as a complex machine having a facsimile function, a printer function, and a copying function, and a facsimile machine.

The PC 1 includes, in addition to the communication I/F 160, a CPU 100, a ROM (Read Only Memory) 110, a RAM (Random Access Memory) 120, a recording medium reading device 130, an operating section (input device) 140, a display portion 150, and a storage device 200.

The ROM 110 stores a BIOS (basic input/output system) which is a basic program for controlling peripheral devices such as the storage device 200 and the recording medium reading device 130. The RAM 120 serves as a working area of the CPU 100 and temporarily stores various data. Under a control of the CPU 100, the recording medium reading device 130 reads out various data stored in a computer-readable recording medium such as a CD-ROM, a flexible disk, and a DVD (Digital Versatile Disk). The operating portion 140 includes a keyboard, a mouse, and the like. The operating portion 140 receives an operating instruction from a user and outputs electric signals to the CPU 100 in accordance with the operating instruction. The display portion 150 is composed of a liquid crystal panel, a CRT (Cathode-Ray Tube) or the like to display various images under a control of the CPU 100.

The storage device 200 is composed of a magnetic disc and the like and stores an operating system, which is a basic program for an integrated control of the personal computer, and a display control program in accordance with an embodiment of the present invention. This display control program renders the CPU 100 to execute a display switching processing of screens at a time when the display portion 150 displays a plurality of screens (the screens may be of different kinds of applications respectively, or may be a plurality of screens provided in one kind of application, and it will be the same hereinafter). In a case where the display control program is stored in a computer-readable recording medium such as a CD-ROM and a flexible disk, the computer-readable recording medium mounted to the recording medium reading device 130 so that the display control program is installed and stored in the storage device 200. Further, in a case where the display control program is stored in a web server on the internet, the display control program may be downloaded from the WEB server so that the program is stored in the storage device 200.

The CPU 100 executes the display control program under a control of the operating system so that it serves as a display controlling portion (display controller) 101, a setting change receiving portion (setting change receiver) 102, a display instruction receiving portion (display instruction receiver) 103, a display part receiving portion (display part receiver) 104, an area specifying instruction receiving portion (area specifying instruction receiver) 105, and a priority order receiving portion (priority order receiver) 106. Further, the CPU 100 serves also as a controller 107 and an output portion 108.

The display controlling portion 101 controls a display operation of the display portion 150. The display controlling portion 101 is capable of displaying a plurality of screens. Each of the plurality of screens has at least one item whose set value is changeable in accordance with an instruction inputted to the operating section 140 by an operator. The display controlling portion 101 sequentially switches displays of the screens and allows the display portion 150 to display the same.

Further, when the display controlling portion 101 switches a currently displayed screen to another screen after a set value of an item which is displayed on any one of the plurality of screens is changed in accordance with a setting change instruction inputted by an operator through the operating section 140 and received by the setting change receiving portion 102, it transmissively displays a display part of the item whose set value is most recently changed in the screen whose set value is changed (previously displayed screen) on the another screen (subsequently displayed screen). This transmissive display will be described in detail hereinafter.

Further, the display controlling portion 101 executes a control of allowing a predetermined part of the previously displayed screen to be transmissively displayed on the subsequently displayed screen at a time of switching of the plurality of screens.

The setting change receiving portion 102 receives from an operator an instruction of changing a set value of each item of a currently displayed screen when the display controlling portion 101 allows the display portion 150 to display any one of the plurality of screens. This set value changing instruction is inputted by an operator to the setting change receiving portion 102 through an operation of the operating section 140.

The display instruction receiving portion 103 receives from an operator an instruction of transmissively displaying a certain number of most recently changed items among items whose set values are changed before the time of switching of the display screen executed by the display controlling portion 101. This set value changing instruction is inputted by an operator to the display instruction receiving portion 103 through an operation of the operating section 140. The display controlling portion 101 allows a display part of each item of a previously displayed screen indicated by an instruction received by the display instruction receiving portion 103 to be transmissively displayed on a subsequently displayed screen at the time of execution of the display switching of the screens.

The display part receiving portion 104 receives from an operator an instruction of specifying a part of the previously displayed screen to be transmissively displayed. This set value changing instruction is inputted by an operator to the display part receiving portion 104 through an operation of the operating section 140. The display controlling portion 101 allows a part of the previously displayed screen indicated by the instruction to be transmissively displayed on the subsequently displayed screen when the display part receiving portion 104 receives an instruction of specifying the part to be transmissively displayed at the time of execution of the display switching of the screens.

The area specifying instruction receiving portion 105 receives from an operator an instruction of specifying a preferential display area in a subsequently displayed screen. In the preferential display area, the transmissive display is not executed, and data which should be originally displayed on the subsequently displayed screen is preferentially displayed. This area specifying instruction is inputted by an operator to the area specifying instruction receiving portion 105 through an operation of the operating section 140. The display controlling portion 101 allows the transmissive display not to be executed in the area indicated by the instruction received by the area specifying instruction receiving portion 105 at the time of execution of the display switching of the screens.

The priority order receiving portion 106 receives from an operator an instruction of setting display priority orders of the screens which are to be displayed by the display portion 150. This setting instruction is inputted by an operator to the priority order receiving portion 106 through an operation of the operating section 140. The display controlling portion 101 determines whether or not the transmissive display is to be executed in accordance with the priority orders indicated by the instruction received by the priority order receiving portion 106 at the time of execution of the display switching of the screens. In other words, the display controlling portion 101 allows the transmissive display to be executed when the priority orders indicated by the instruction received by the priority order receiving portion 106 show that the previously displayed screen has a higher priority order than that of the subsequently displayed screen at the time of execution of the display switching of the screens.

The controller 107 executes an overall operational control of the PC 1, and it executes various controls necessary for a printing processing in accordance with an instruction inputted by an operator through the operating section 140. Further, the output portion 108 outputs data applied with a data conversion, which is a processing necessary for printing by an unillustrated printer-printing data converting portion, to the printer 20 through the communication I/F 160.

It should be understood that a display control device in accordance with the embodiments of the present invention includes, for example, the display portion 150 and the CPU 100 (necessary functions among the display controlling portion 101, the setting change receiving portion 102, the display instruction receiving portion 103, the display part receiving portion 104, the area specifying instruction receiving portion 105, and the priority order receiving portion 106).

Figure 2:
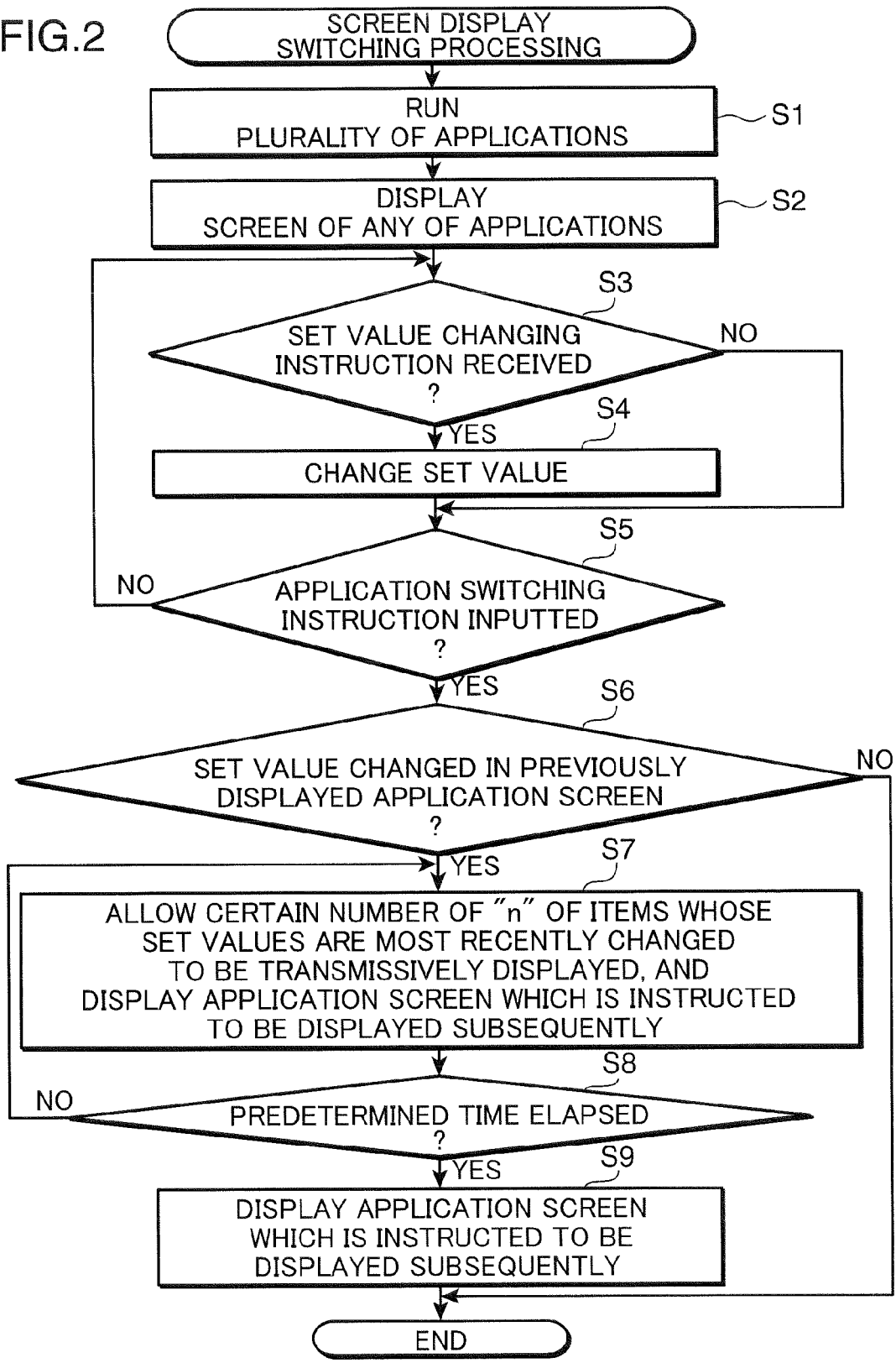
FIG. 2 is a flowchart showing a first embodiment of a screen display switching processing executed by the PC.
Figure 4:
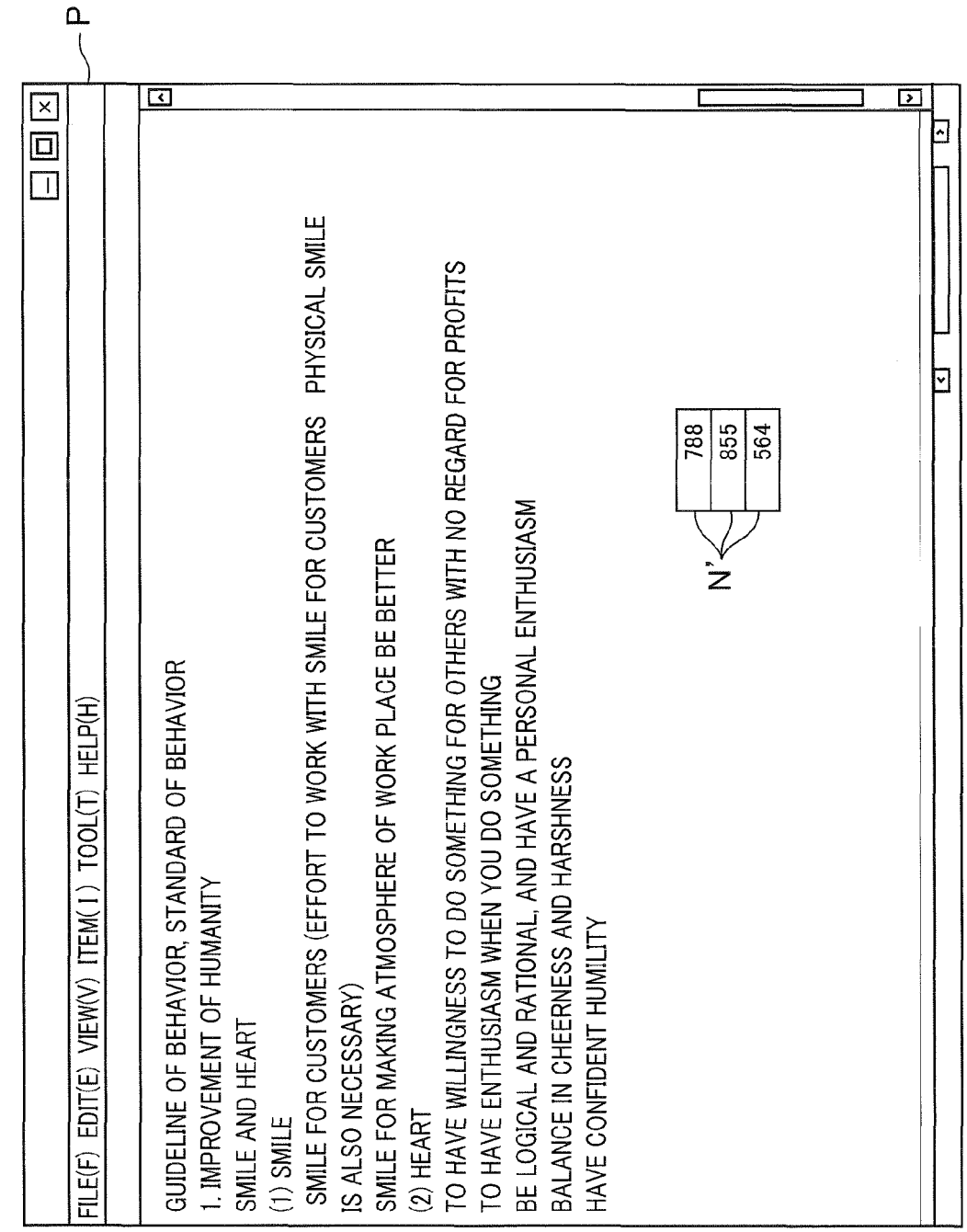
FIG. 4 shows an example of a screen display of the display portion.

Next, a first embodiment of a screen display switching control executed by the PC 1 in which a display control program in accordance with the embodiment of the present invention installed will be described. FIG. 2 is a flowchart showing the first embodiment of the screen display switching processing executed by the PC 1. FIGS. 3 and 4 show examples of the screen display of the display portion 150.

When the CPU 100 runs two applications, for example, a word processor and a spread sheet (S1), and the display controlling portion 101 allows the display portion 150 to display a screen M of the spread sheet (S2) as shown in FIG. 3, and the setting change receiving portion 102 receives a set value changing instruction from an operator through an operation of the operating section 140 (YES in S3), the CPU 100 changes a set value of an item whose setting should be changed in accordance with the changing instruction (S4). For example, when an operator newly inputs a numerical value or a character to a certain cell (item) while the screen M of the spread sheet is displayed, the controller 107 changes a set value of the cell to the newly inputted numerical value or character.

Then, when an operator operates the operating section 140 to input an application switching instruction (YES in S5), the display controlling portion 101 determines whether or not a set value is changed in the previously displayed application screen (here, it is the screen of the spread sheet) (S6). For example, if an operator operates a mouse to click a display part of an illustrated task bar indicating the word processor in a state where the display controlling portion 101 allows the display portion 150 to display the screen of the spread sheet as described above, the display controlling portion 101 determines whether or not the set value is changed.

Here, when the display controlling portion 101 determines that the set value is not changed in the previously displayed application screen (NO in S6), it allows the display portion 150 to display another application screen which instructed to be displayed as the subsequently displayed screen (S9). For example, the display controlling portion 101 switches the display screen of the display portion 150 from the previously displayed screen of the spread sheet to the screen of the word processor which is instructed to be displayed.

On the other hand, when the display controlling portion 101 determines that a set value is changed in the previously displayed application screen (YES in S6), it allows the display portion 150 to display an application screen which is instructed to be displayed in accordance with the switching instruction, while allowing a certain number "n" (n is a predetermined numerical value) of most recently changed items, whose respective set values are changed before the time of screen display switching, to be transmissively displayed on the subsequently displayed screen (S7). For example, as shown in FIG. 4, the display controlling portion 101 allows the screen P of the word processor as a subsequently displayed screen to be displayed on the uppermost layer, and allows the screen M of the previously displayed spread sheet to be hidden or allows at least a part of the screen M overlapping the screen P of the word processor to be hidden. However, a display part of the item whose set value is changed as described above (a cell and the like in which a numerical value or character is newly inputted) is displayed on the screen P of the word processor as a transmissive display part N'. This enables an operator to see the cell, into which a numerical value or character is newly inputted in the screen M of the spread sheet, transmissively through the screen P of the word processor.

Then, the display controlling portion 101 measures elapsed time from the time of starting the transmissive display by means of an unillustrated timer provided in the CPU 100. When a predetermined time elapses (for example, 5 secs-600 secs) (YES in S8), the display controlling portion 101 allows the transmissive display part in the subsequently displayed application screen to be hidden, and allows the display portion 150 to display the whole application screen instructed to be displayed as a subsequently displayed screen (S9).

It is more preferable that the display controlling portion 101 allows the display portion 150 to display the transmissive display part N' in a decorated form emphasizing in a manner such that the transmissive display part N' shows a screen provided in a lower layer (lower side or rear side screen). For example, the transmissive display part N' is surrounded by a frame, made different in color from other parts, displayed in blinking, or made thinner in density (in other words, brightness is lowered). This enables an operator to easily distinguish that the transmissive display part N' is not data which is handled in the subsequently displayed screen (in the example above, it is the screen P of the word processor) but data of the previously displayed screen (in the example above, it is the screen M of the spread sheet). The same will be applied to the transmissive display parts shown in the embodiments described hereinafter.

Further, for example, the display controlling portion 101 may allow the brightness of the transmissive display parts in the screens to be higher (allow the density to get higher) as the layers of the screens goes from a lower layer to a higher layer when a plurality of screens are displayed in an overlapping manner while accompanied by the transmissive display.

Figure 5:
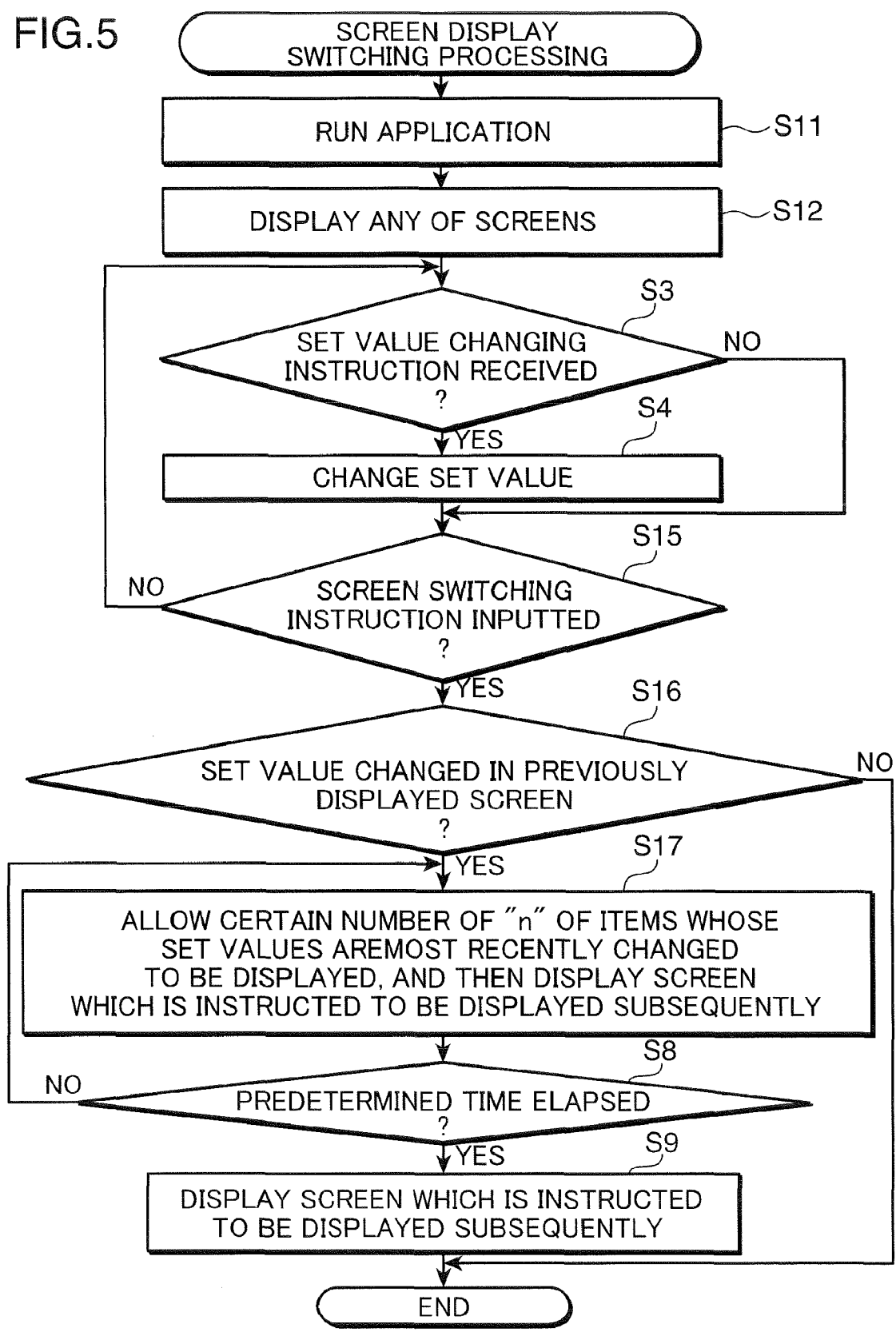
FIG. 5 is a flowchart showing a second embodiment of the display switching processing.
Figure 6A:
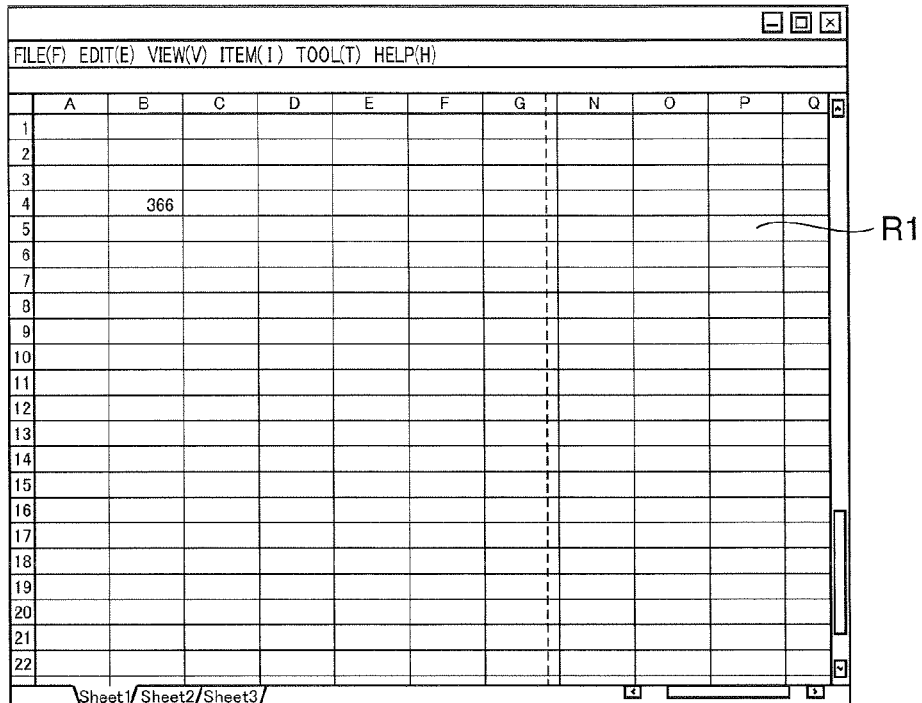
FIGS. 6A and 6B show examples of a screen display of the display portion.
Figure 6B:
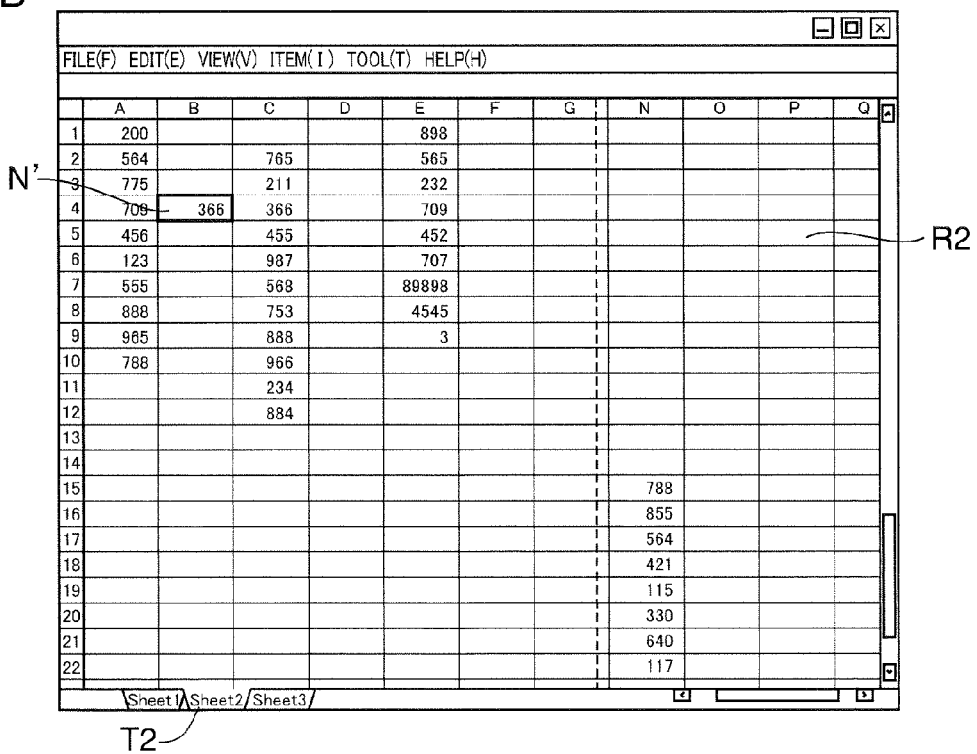

Next, a display switching processing in accordance with a second embodiment of the present invention will be described. FIG. 5 is a flowchart showing the second embodiment of the display switching processing. FIGS. 6A and 6B show examples of the screen display of the display portion 150. It should be understood that the processing which are the same as those of the first embodiment described with reference to FIG. 2 will be identified with the same reference numerals, and descriptions of those will be omitted.

In the display switching control in accordance with the first embodiment, the display controlling portion 101 switches displays of screens of different applications. However, in the display switching control in accordance with the second embodiment, the display controlling portion 101 executes the screen display switching processing to a plurality of screens provided in one application.

When the CPU 100 runs a single application such as a spread sheet (S11), and the display controlling portion 101 allows the display portion 150 to display a first screen R1 as shown in FIG. 6A (S12), and an operator operates the operating section 140 to input an instruction of switching to another screen (YES in S15), the display controlling portion 101 determines whether or not a set value is changed in the previously displayed screen (here, it is the first screen R1) (S16). For example, when an operator operates a mouse to click a display part of a tab T2 indicating a second screen R2 in a state where the display controlling portion 101 allows the display portion 150 to display the first screen R1 of the spread sheet, the display controlling portion 101 determines whether or not the set value is changed in the first screen R1.

Here, when the display controlling portion 101 determines that the set value is not changed in the previously displayed screen (NO in S16), it does not execute the transmissive display and allows the display portion 150 to display another screen instructed to be displayed as a subsequently displayed screen (S19). For example, the display controlling portion 101 switches the display screen of the display portion 150 from the previously displayed first screen R1 to the second screen R2 instructed to be displayed as a subsequently displayed screen.

On the other hand, when the display controlling portion 101 determines that a set value is changed in the previously displayed screen (YES in S16), it allows the display portion 150 to display another screen which is instructed to be displayed as a subsequently screen, while allowing a certain number "n" ("n" is a predetermined numerical value) of most recently changed items, whose set values are changed in the past before the time of screen display switching, to be transmissively displayed on the subsequently displayed screen (S17). In other words, as shown in FIG. 6B, the display controlling portion 101 allows the second screen R2 instructed to be as a subsequently displayed screen to be displayed on the uppermost layer, and allows the previously displayed first screen R1 to be hidden. Further, the display controlling portion 101 allows a display part of the item whose set value is changed as described above (a cell and the like in which a numerical value or character is newly inputted) to be displayed as a transmissive display part N' on the second screen R2.

In the above described first and second embodiments, the display controlling portion 101 allows a certain number "n" ("n" is a predetermined numerical value) of most recently changed items, whose set values are changed before the time of screen display switching, to be transmissively displayed on the subsequently displayed screen. However, (1) it may be so configured that a setting of how many of items whose respective set values are changed most recently is to be displayed may be properly changed in accordance with a numerical value received by the display instruction receiving portion 103 through an operator's operation to the operating section 140. Further, (2) the display controlling portion 101 may allow only one item, whose set value is most recently changed before the time of screen display switching, to be transmissively displayed, or (3) the display controlling portion 101 may allow all of the items, whose respective set values are changed in the past before the time of screen display switching, to be transmissive displayed.

Figure 7:
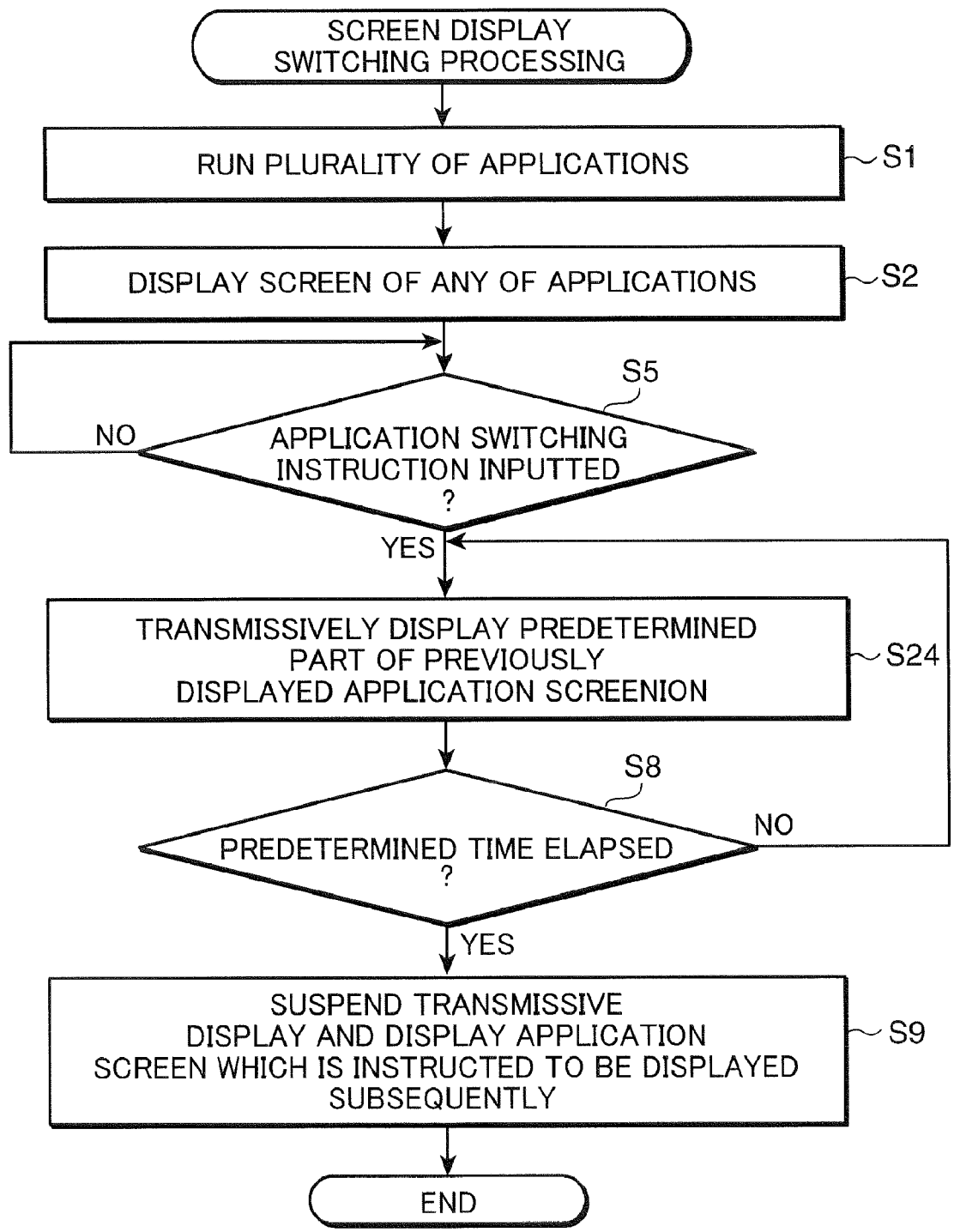
FIG. 7 is a flowchart showing a third embodiment of the display switching processing.
Figures 8A, 8B, 8C:
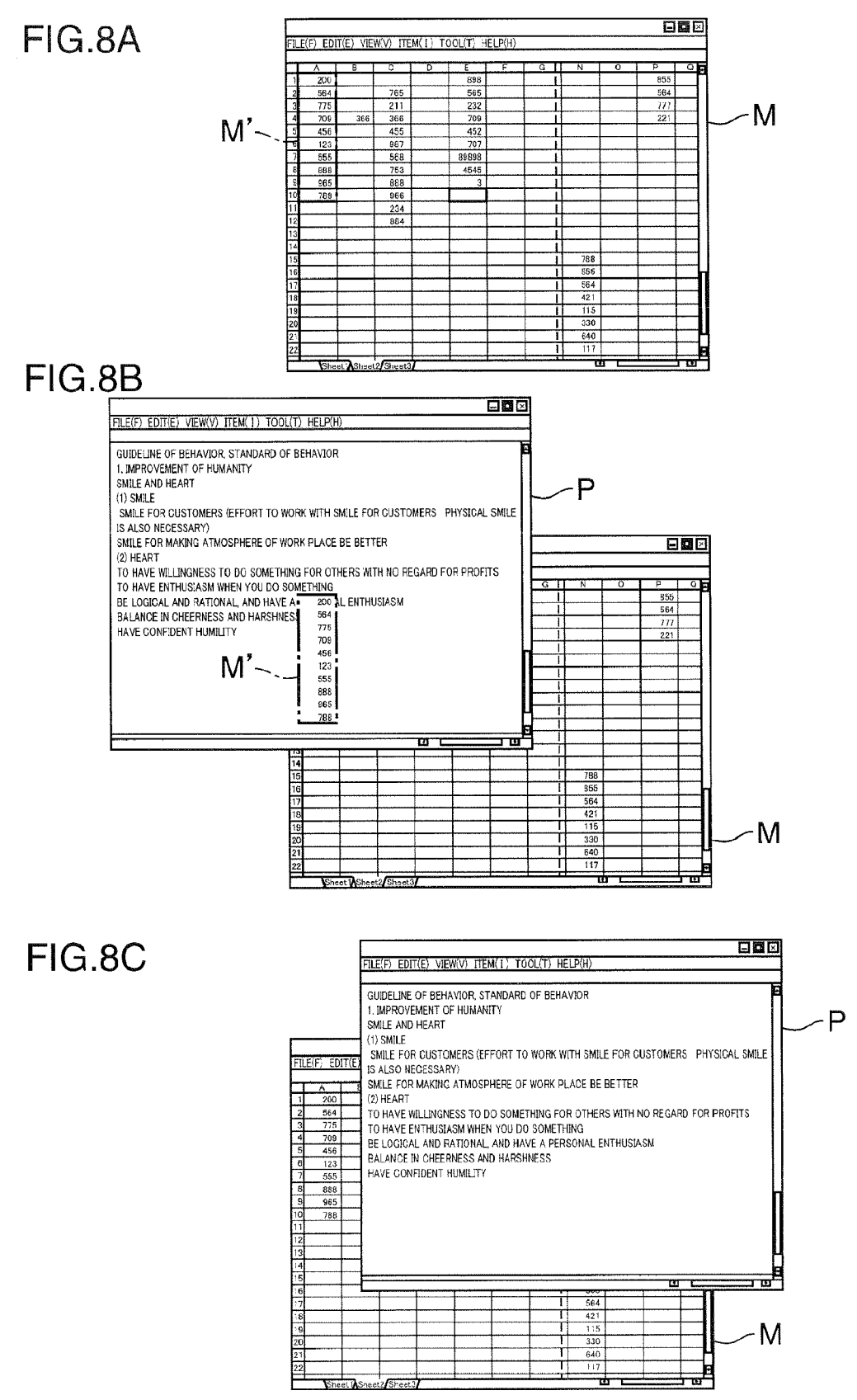

Next, a display switching processing in accordance with a third embodiment of the present invention will be described. FIG. 7 is a flowchart showing the third embodiment of the display switching processing. FIGS. 8A, 8B, and 8C show examples of the screen display of the display portion 150. It should be understood that the processing which are the same as those of the first and second embodiments described with reference to FIGS. 2 and 5 will be identified with the same reference numerals, and descriptions of those will be omitted.

In the first and second embodiments, the display controlling portion 101 allows a display part of an item, whose set value is changed in a previously displayed screen, to be transmissively displayed on a subsequently displayed screen. However, in the third embodiment, the display controlling portion 101 stores information of a specified part which is predetermined in a previously displayed screen and transmissively displayed on a subsequently displayed screen. The display controlling portion 101 allows the specified part, which is predetermined in the previously displayed screen, to be transmissively displayed on the subsequently displayed screen in accordance with the specified part information.

The third embodiment will be described with reference to FIG. 7. When the CPU 100 runs two applications including, for example, a word processor and a spread sheet (S1), and the display controlling portion 101 allows the display portion 150 to display a screen M of the spread sheet as shown in FIG. 3 (S2), and an operator operates the operating section 140 to input an instruction of switching the applications (YES in S5), the display controlling portion 101 specifies in accordance with the specified part information a part M' (FIG. 8A) of the previously displayed screen which is predetermined as a part to be transmissively displayed. Then, the display controlling portion 101 allows the display portion 150 to display another screen while allowing the part M' to be transmissively displayed on the another screen instructed to be displayed as a subsequently displayed screen, for example, the screen P of the word processor (FIG. 8B, S24 in FIG. 7).

In this case, the display controlling portion 101 executes the transmissive display as shown in FIG. 8B when the predetermined part exists at a hidden part of the screen M of the previously displayed spread sheet onto which the screen P of the word processor overlaps. However, the display controlling portion 101 does not execute the transmissive display but allows the display portion 150 to display only the screen P of the word processor as shown in FIG. 8B when the predetermined part does not exist at a hidden part of the screen M of the previously displayed spread sheet onto which the screen P of the word processor overlaps.

Figure 9:
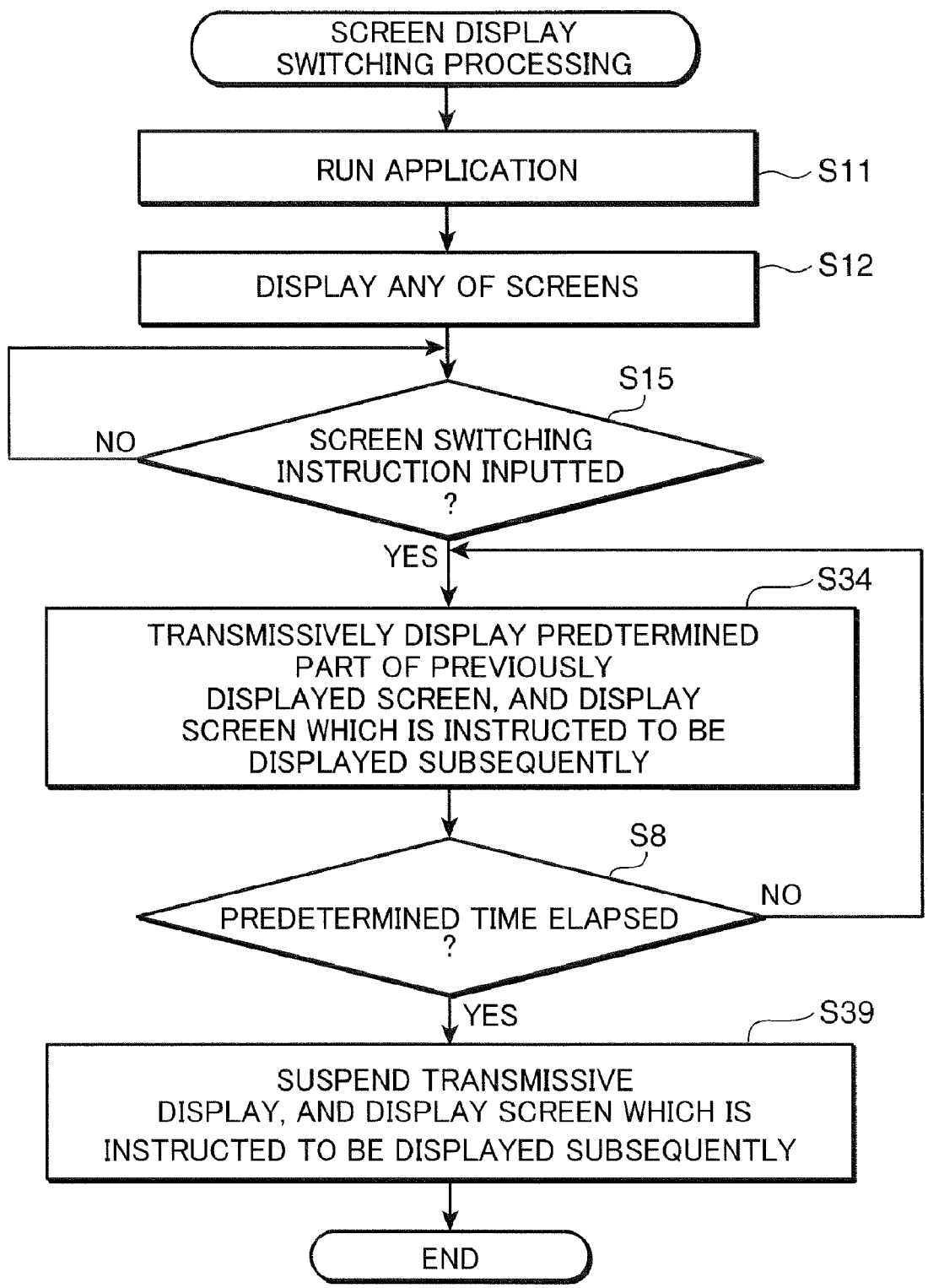
FIG. 9 is a flowchart showing a fourth embodiment of the screen display switching processing.

Next, the screen display switching processing in accordance with a fourth embodiment of the present invention will be described. FIG. 9 is a flowchart showing the fourth embodiment of the screen display switching processing. It should be understood that descriptions of the processing which are the same as those of the first through third embodiments will be omitted.

In the screen display switching control in accordance with the third embodiment, the display controlling portion 101 executes switching of displays of screens of different applications. However, in the display switching control in accordance with the fourth embodiment, the display controlling portion 101 executes display switching of a plurality of screens provided in one application.

When the CPU 100 runs a single application, for example, a spread sheet (S11), and the display controlling portion 101 allows the display portion 150 to display the first screen R1 as shown in FIG. 6A (S12), and an operator operates the operating section 140 to input an instruction of switching to another second screen R2 (YES in S15), the display controlling portion 101 specifies a predetermined part of the previously displayed screen R1 as a part to be transmissively displayed in accordance with specified part information which it stores, and then allows the display portion 150 to display the second screen R2 and transmissively display the specified part on the second screen R2 which is instructed to be displayed as a subsequently displayed screen (S34).

Figure 11A:
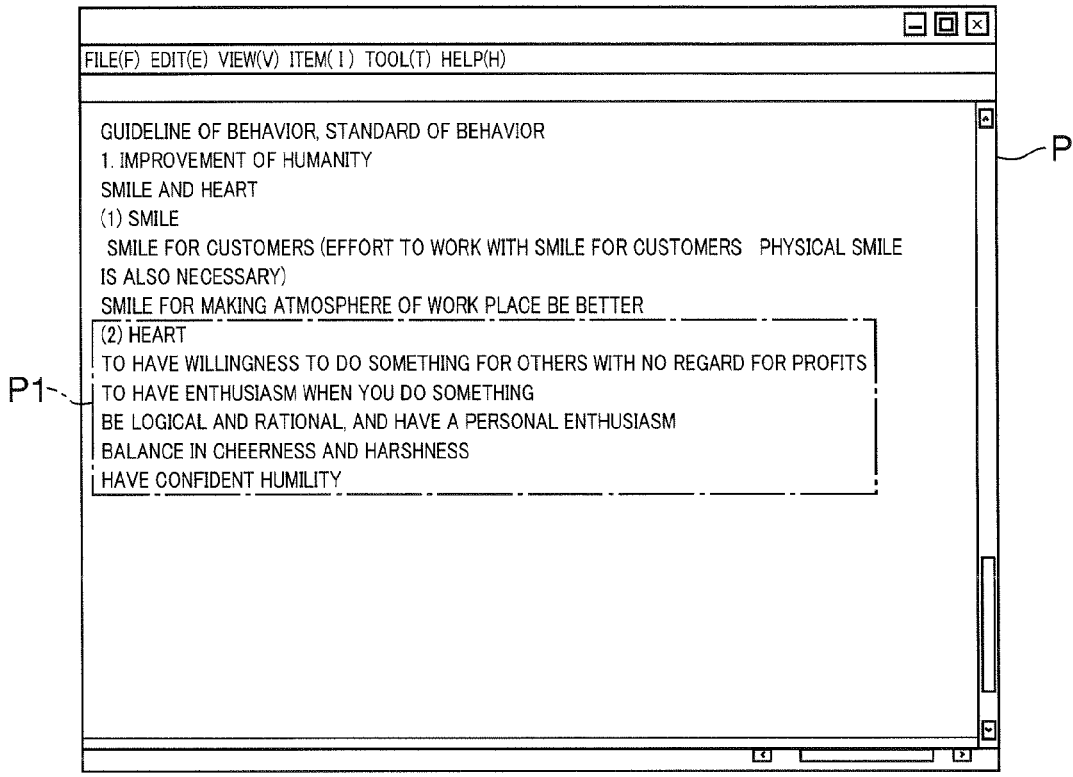
FIGS. 11A and 11B show examples of a screen display of the display portion.
Figure 11B:
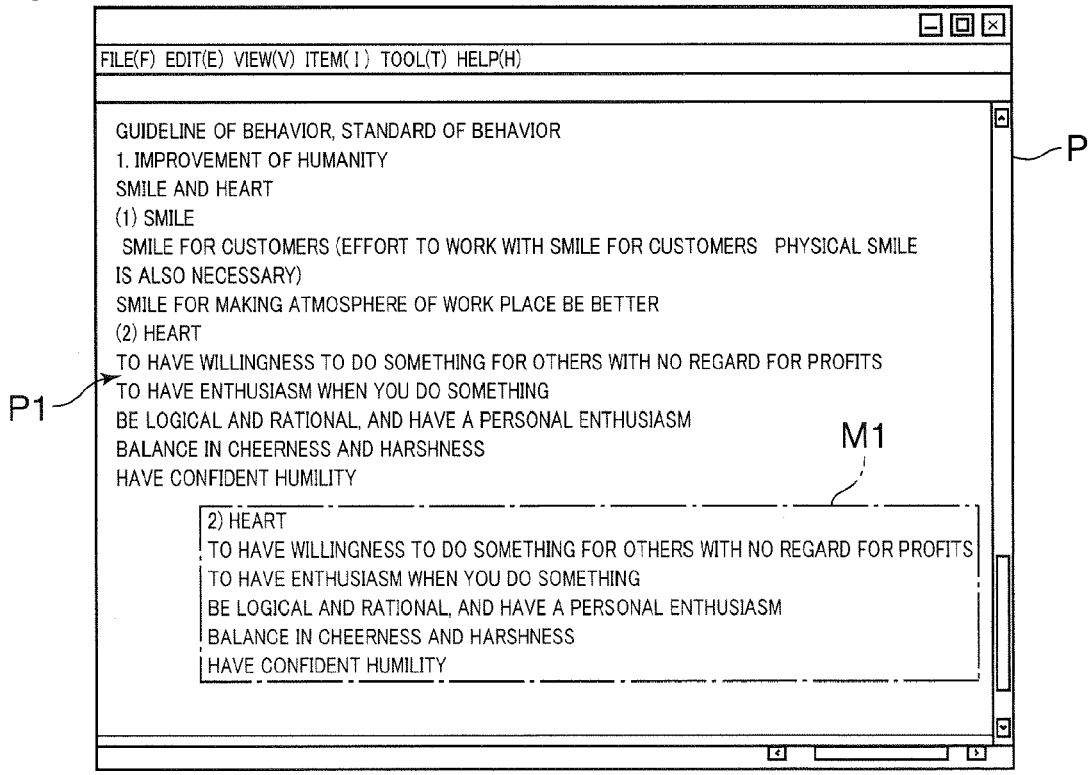

Next, the display switching processing in accordance with a fifth embodiment of the present invention will be described. FIG. 10 is a flowchart showing a fifth embodiment of the display switching processing. FIGS. 11A and 11B show examples of the screen display of the display portion 150. It should be understood that descriptions of processing which are the same as those of the first through fourth embodiments will be omitted.

In the third embodiment, the display controlling portion 101 allows a specified part of a previously displayed screen to be transmissively displayed on a subsequently displayed screen. However, in the fifth embodiment, when data of the previously displayed application screen is used in the subsequently displayed application screen by a moving processing or copying processing, the display controlling portion 101 allows a display part of original data of a previously displayed application screen used for the moving processing or copying processing to be transmissively displayed on the subsequently displayed application screen as the specified part.

The processing will be described with reference to FIG. 10.

When an operator operates the operating section 140 to input an instruction of switching the application (YES in S5), the display controlling portion 101 allows the display portion 150 to display an application screen instructed to be displayed, for example, the screen P of the word processor (S35). After this switching of display, the display controlling portion 101 detects whether or not the data of the previously displayed screen is pasted on the subsequently displayed screen P by the moving processing or copying processing as shown in FIG. 11A (S36). When data P1 of the previously displayed application screen is pasted by the moving processing or copying processing (YES in S36), the display controlling portion 101 allows a display part M1 of original data of the previously displayed application screen, which is hidden behind the subsequently displayed application screen (the screen P of the word processor) at this point of time and used for the moving processing and copying processing, to be transmissively displayed on the subsequently displayed application screen as shown in FIG. 11B (S37).

In the fifth embodiment, the case where the display controlling portion 101 switches displays of screens of different applications is described as an example. However, even in a case where the display controlling portion 101 executes the display switching of a plurality of screens provided in one application, the original data used for the moving processing or copying processing can be transmissively displayed by a similar processing.

Further, in the fifth embodiment, it is described that the display controlling portion 101 allows the original data used for the moving processing or copying processing to be transmissively displayed. However, as long as the data associates with the previously displayed screen and subsequently displayed screen, the data can be transmissively displayed on the subsequently displayed screen by the processing similar to that described above even though the data is not original data used for the moving processing or copying processing.

Next, other embodiment of the transmissive display processing shown in the above-described embodiments will be described. FIG. 12 is a flowchart showing a second embodiment of the transmissive display processing. It should be understood the transmissive display processing according to each embodiment is applied at a time of executing S24 of the third embodiment shown in FIG. 7, S24 of the fourth embodiment shown in FIG. 9, and S37 of the fifth embodiment shown in FIG. 10.

The embodiment will be described with reference to FIG. 12. The display controlling portion 101 determines whether or not data which should be displayed on the subsequently displayed screen exists at a part of the subsequently displayed screen where the transmissive display processing is to be executed when the display controlling portion 101 executes the transmissive display processing (S51). When data which should be displayed exists at a part of the subsequently displayed screen where the transmissive display processing is to be executed (YES in S51), the display controlling portion 101 does not execute the above-described transmissive display, and it allows the data which should be displayed on the subsequently displayed screen to be preferentially displayed (S52).

On the other hand, when the data which should be displayed does not exist at a part of the subsequently displayed screen where the transmissive display processing is to be executed (NO in S51), the display controlling portion 101 allows the predetermined part of the previously displayed screen to be transmissively displayed on the subsequently displayed screen (S53).

This ensures convenience in confirming and handling of data of the previously displayed screen obtained by the transmissive display while ensuring visibility of various data displayed on the subsequently displayed screen with respect to an operator.

In this second embodiment, the display controlling portion 101 does not execute the above-described transmissive display when the data which should be displayed exists at a part of the subsequently displayed screen where the transmissive display processing is to be executed. However, even in a case where the data which should be displayed does not exist at a part of the subsequently displayed screen where the transmissive display processing is to be executed, it may be so configured that the above-described transmissive display is not executed within a predetermined area close to the area where the data which should be displayed exists. Further, it may be so configured that the predetermined area in which the transmissive display is prohibited can be properly changed by an operator by an instruction which is inputted by the operator through an operation of the operating section 140.

Next, a third embodiment of the transmissive display processing will be described. FIG. 13 is a flowchart showing the third embodiment of the transmissive display processing.

In the third embodiment, the display controlling portion 101 stores priority order information with respect to other screen respectively for each application screen or each of screens provided in one application. Further, as shown in FIG. 13, at a time of execution of the transmissive display processing, the display controlling portion 101 determines in accordance with priority order information of each of the previously displayed screen and subsequently displayed screen (S61), whether or not a priority order of the previously displayed screen is higher than a priority order of the subsequently displayed screen (S62).

When the priority order of the previously displayed screen is higher than the priority order of the subsequently displayed screen (YES in S62), the display controlling portion 101 allows the predetermined part of the previously displayed screen to be transmissively displayed on the subsequently displayed screen (S64).

On the other hand, when the priority order of the previously displayed screen is lower than the priority order of the subsequently displayed screen (NO in S62), the display controlling portion 101 does not execute the above-described transmissive display, and it allows the subsequently displayed screen to be displayed preferentially (S63).

It may be so configured that setting of the priority order information which the display controlling portion 101 stores for each screen can be properly changed by an operator through an operation of the operating section 140.

Next, a fourth embodiment of the transmissive display processing will be described. FIG. 14 is a flowchart showing the fourth embodiment of the transmissive display processing.

In the fourth embodiment, the display controlling portion 101 stores information of areas at which the transmissive display is prohibited. The information is stored for each application screen or each of screens provided in one application. Further, as shown in FIG. 14, at a time of execution of the transmissive display processing, the display controlling portion 101 reads out information of area at which the transmissive display is prohibited, and it determines whether or not a part of the subsequently displayed screen where the transmissive display is to be executed is the area at which the transmissive display is prohibited (S71).

When the part of the subsequently displayed screen at which the transmissive display is prohibited is an area where the transmissive display is prohibited (YES in S71), the display controlling portion 101 does not execute the above-described transmissive display, and it allows the subsequently displayed screen to be displayed preferentially (S72).

On the other hand, when a part of the subsequently displayed screen where the transmissive display is to be executed is not an area at which the transmissive display is prohibited (NO in S71), the display controlling portion 101 allows the predetermined part of the previously displayed screen to be transmissively displayed on the subsequently displayed screen (S73).

It may be so configured that setting of information of area stored by the display controlling portion 101 and allowing the transmissive display can be properly changed by an operator by an instruction inputted by the operator through an operation of the operating section 140.

It should be understood that the present invention is not limited to the configurations of the above-described embodiments, and it may be modified in various ways. For example, in each of the above-described embodiments, the display controlling portion 101 executes the transmissive display for a predetermined time. However, this control may be omitted. The transmissive display may be executed on the subsequently displayed screen while the subsequently displayed screen is displayed.

Further, in each of the above-described embodiments, the display controlling portion 101 allows a predetermined part of a previously displayed screen to be transmissively displayed on a subsequently displayed screen. However, the predetermined part is not limited to indicate a position or area, and it may be a predetermined character or sign, or a display configuration such as bold lines, underlines, a predetermined color, and a predetermined font, and characters, signs, and numerals of a predetermined size. Further, it may be so configured that setting of the predetermined display configuration can be properly changed by an operator with an instruction inputted by the operator through an operation of the operating section 140.

Further, in the above-described embodiments, FIGS. 4, 6, 8 and 11 show examples of the transmissive display (display in a transmissive manner) executed by the display controlling portion 101. The transmissive display includes at least a meaning of superimposing displays of a previous screen display and a subsequent screen display at a time when screens overlaps with each other, and a meaning of not displaying a front screen but only a rear screen transmissively.

In the embodiments described above, the personal computer 1 is described as an electronic equipment in accordance with the embodiments of the present invention. However, an electronic equipment in accordance with an embodiment of the present invention is not limited to a personal computer. The electronic equipment in accordance with the present invention includes at least a personal computer, a mobile phone, a PDA (Personal Digital Assistants), a digital watch, a printer, a copying machine, a facsimile machine, a complex machine, a digital camera, a TV, a video player, an audio player, a microwave oven, a refrigerator, an ATM (Automated Teller Machine), and a car navigation system, and it goes without saying that the present invention can be applied to these electronic equipments.

Further, in the above-described embodiments, configurations and controls of a display control program, a display device, and a display control method in accordance with an embodiment of the present invention is described with reference to FIGS. 1 through 14. However, these are mere examples, and there is no meaning of limiting the display control program, the display control device, and the display control method in accordance with the present invention to the above-described configurations and controls.

In summary, the present invention includes a computer-readable recording medium which stores a display control program for rendering a display portion of an electronic equipment to display a plurality of screens, the display control program renders the electronic equipment to function as: a display controller which switches display of the plurality of screens, each screen enabling an operator to change a set value of at least one item; and a setting change receiver which receives from the operator an instruction of changing a set value of each item included in a currently displayed screen when the display controller allows the display portion to display one of the plurality of screens. When the currently displayed screen is switched to another screen after a set value of an item included in one of the plurality of screens is changed in accordance with the setting change instruction received by the setting change receiver, the display controller allows a display part of the item whose set value is changed most recently in the screen whose set value is changed to be transmissively displayed on the another screen displayed after the switching of display.

Further, according to the present invention, the display control program renders the electronic equipment to function so that the switching of display of the plurality of screens is performed as switching of screens of different applications.

According to the invention above, when an operator allows display of a display portion of an electronic equipment to be switched from a currently displayed screen to another screen, a display part of the item whose set value is changed most recently in the currently displayed screen is transmissively displayed on the another screen which is displayed after the switching of display. Accordingly, even in a case where a plurality of screens are successively switched and displayed on the display portion of the electronic equipment, the set value which is changed most recently in the previously displayed screen can be easily confirmed and handled.

Further, according to the present invention, the display control program further renders the electronic equipment to function as: a display instruction receiver for receiving from the operator an instruction of transmissively displaying a certain number of most recently changed items among items whose respective set values are changed at a time of the switching of display. In a case of executing the switching of display, the display controller allows the items which are indicated by the instruction received by the display instruction receiver to be transmissively displayed.

According to this invention, in a case where the display controller executes the switching of screens of the display portion, the plurality of items changed most recently are transmissively displayed. Accordingly, a user can desirably set the number of items which are to be transmissively displayed and a time range of the changes.

Further, the present invention includes a computer-readable recording medium which stores a display control program for rendering a display portion of an electronic equipment to display a plurality of screens. The display control program renders the electronic equipment to function as: a display controller which switches display of the plurality of screens and allows the display portion to transmissively display a predetermined part of a previously displayed screen on a subsequently displayed screen at the time of switching the screens.

According to the invention, when displays of a plurality of screens are switched on the display portion of the electronic equipment, a predetermined part of a previously displayed screen is transmissively displayed on a subsequently displayed screen. Accordingly, even in a case where a plurality of screens are successively switched to be displayed on the display portion of the electronic equipment, a part of a display of a previously displayed screen can be easily confirmed and handled on a subsequently displayed screen.

Further, according to the present invention, the display control program renders the electronic equipment to function as: a display part receiver which receives from an operator an instruction of specifying a part of the previously displayed screen which is to be transmissively displayed. The display controller allows the part included in the previously displayed screen and indicated by the instruction received by the display part receiver to be transmissively displayed on the subsequently displayed screen at the time of switching of the screens.

According to this invention, a user's desirable part in the previously displayed screen can be set so that the part can be changed to be transmissively displayed on the subsequently displayed screen.

Further, according to the present invention, the display control program renders the electronic equipment to function so that when the subsequently displayed screen includes data associated with the previously displayed screen, the display controller allows a display part of the associated data of the previously displayed screen to be transmissively displayed as the predetermined part.

According to this invention, a display part of data associated with data of the previously displayed screen is transmissively displayed on a subsequently displayed screen. Accordingly, even in a case where a plurality of screens are successively switched to be displayed on the display portion of the electronic equipment, an operator can easily confirm or handle associated data of the previously displayed screen and the subsequently displayed screen.

Further, according to the present invention, the display control program renders the electronic equipment to function so that the display controller allows the data of the previously displayed screen being original data, which is applied with a moving processing or a copying processing, to be transmissively displayed on the subsequently displayed as the associated data.

According to this invention, the data of the previously displayed screen being original data, which is applied with a moving processing or a copying processing, is transmissively displayed. Accordingly, an operator can easily confirm and handle the original data which is applied with a moving processing or a copying processing without performing an operation of referring back to a previously displayed screen.

Further, according to the present invention, the display control program renders the electronic equipment to function so that when a part or a peripheral part of the subsequently displayed screen on which the transmissive display is to be executed is instructed as a part on which data is to be displayed on the subsequently displayed screen, the display controller does not execute the transmissive display but gives a priority to display of data which is to be displayed on the subsequently displayed screen.

According to this invention, the display controller does not execute the transmissive display at a part or a peripheral part of the subsequently displayed screen, but execute display of data to be displayed on a subsequently displayed screen preferentially the data which is to be displayed on the subsequently displayed screen. Accordingly, it can avoid a case where the data to be displayed on the subsequently displayed screen is not displayed by the transmissive display and an operator cannot confirm the data.

Further, according to the present invention, the display control program further renders the electronic equipment to function as: an area specifying instruction receiver for receiving from an operator an instruction of specifying an area of a preferential display part on the subsequently displayed screen, and the display controller allows the transmissive display to be not executed on an area which is indicated by the instruction received by the area specifying instruction receiver at the time of the display switching.

According to this invention, an operator can desirably specify an area of a preferential display part on the subsequently displayed screen without executing the transmissive display on the subsequently displayed display screen by the area specifying instruction receiver.

Further, according to the present invention, the display control program renders the electronic equipment to function so that the display part receiver receives the display part formed of a display configuration specified by the operator as the predetermined part to be transmissively displayed.

According to this invention, an operator can specify so that a part to be displayed in a specific display configuration in the previously displayed screen to be transmissively displayed on the subsequently displayed screen by the display part receiver.

Further, according to the present invention, the display control program renders the electronic equipment to function so that when the display controller allows screens having respective priority order information to be superimposedly displayed by the display switching, and a priority order of the previously displayed screen is higher than a priority order of the subsequently displayed screen, the display controller executes the transmissive display.

According to the present invention, visibility of data displayed on the subsequently displayed screen can be secured in accordance with the priority order, and confirming and handling of data of the previously displayed screen by the transmissive display becomes easy.

Further, according to the present invention, the display control program renders the electronic equipment to function as: a priority order receiver for receiving from an operator an instruction of setting the priority orders. When the priority orders indicated by the instruction received by the priority order receiver show that the priority order of the previously displayed screen is higher than the priority order of the subsequently displayed screen at the time when the display controller allows the display switching to be performed, the display controller executes the transmissive display.

According to this invention, an operator can desirably set by the priority order receiver whether or not the transmissive display is to be executed at a time when the screens are displayed in superimposition with each other.

Further, according to the present invention, the display control program renders the electronic equipment to function so that when a part of the subsequently displayed screen at which the transmissive display is to be executed is a predetermined part set in advance, the display controller executes the transmissive display.

According to this invention, the display controller allows the transmissive display to be executed only at a predetermined part on the subsequently displayed screen. Accordingly, the part at which the transmissive display is executed and the part at which the transmissive display is not executed can be divided.

Further, according to the present invention, the display control program renders the electronic equipment to function so that the display controller executes the transmissive display for a predetermined time.

According to this invention, the display controller executes the transmissive display for a predetermined time on the subsequently displayed screen. Accordingly, a time during which the transmissive display is executed can be controlled.

Further, according to the present invention, the display control program renders the electronic equipment to function so that the display controller makes a display form of the transmissively displayed part to be different from other parts.

According to this invention, the display form of the transmissively displayed part is different from other parts. Accordingly, an operator can easily distinguish that the transmissively displayed part is not the data handled in the subsequently displayed screen but data of the previously displayed screen.

Further, according to the present invention, the display control program renders the electronic equipment to function so that the display controller allows the plurality of screens to be displayed in superimposition along with the transmissive display in a manner such that a brightness of the transmissive display part becomes higher as it goes from a screen in a lower layer to a screen in a higher layer.

According to this invention, the plurality of screens are displayed in superimposition along with the transmissive display in a manner such that a brightness of the transmissive display part becomes higher as it goes from a screen in a lower layer to a screen in a higher layer. Accordingly, an operator can understand a history of processing applied to data displayed in the transmissively displayed part in accordance with a brightness of the transmissively displayed part. The history includes which of the screens the data displayed in the transmissively displayed part is processed, and in which previously operated screen data of the transmissively displayed part is processed.

Further, the present invention includes a display control device comprising: a display portion which displays a plurality of screens; and a display controller which switches displays of the plurality of screens by the display portion, the display controller allowing a predetermined part of a previously displayed screen to be displayed on a subsequently displayed screen at the time of switching the screens.

Further, according to the present invention, the display control device further comprises: a setting change receiver which receives from the operator an instruction of changing a set value of each item included in a currently displayed screen when the display controller allows the display portion to display one of the plurality of screens. When a currently displayed screen is switched to the subsequently displayed screen after a set value of an item included in one of the plurality of screens is changed in accordance with the setting change instruction received by the setting change receiver, the display controller allows a display part of the item whose set value is changed most recently in the screen whose set value is changed to be transmissively displayed on the subsequently displayed screen.

Further, according to the present invention, the display controller allows the switching of display of the plurality of screens to be performed as switching of screens of different applications.

This application is based on Japanese Patent application serial No. 2006-352805 filed in Japan Patent Office on Dec. 27, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A computer-readable recording medium which stores a display control program for rendering a display portion of an electronic equipment to display a plurality of screens, the display control program renders the electronic equipment to function as:
   - a display controller which switches display of the plurality of screens, each screen enabling an operator to change a set value of at least one item; and
   - a setting change receiver which receives from the operator an instruction of changing a set value of at least one item included in a currently displayed screen when the display controller allows the display portion to display one of the plurality of screens,
   - wherein the display controller determines whether the set value of one of the at least one item included in one screen is changed in accordance with the setting change instruction received by the setting change receiver when the display controller allows the display portion to display the one screen,
   - in a case where the one screen is switched to another screen to display the other screen overlapped on the one screen, the display controller allows the other screen as a subsequently displayed screen to be displayed on an uppermost layer, allows the one screen, which was previously displayed, to be hidden and allows a part of the other screen corresponding to a display part of the item whose set value is changed most recently on the one screen to be transmissively displayed in order to see the display part of the item whose set value is changed most recently on the one screen through the other screen when the display controller determines the set value is changed,
   - in the case where the one screen is switched to the another screen to display the other screen overlapped on the one screen, the display controller allows to switch from the one screen, which was displayed previously, to the other screen that is instructed to be displayed and does not allow a transmissive display when the display controller determines the set value is not changed.

2. The computer-readable recording medium which stores the display control program according to claim 1, wherein the display control program renders the electronic equipment to function so that the switching of display of the plurality of screens is performed as switching of screens of different applications,
   the different applications are a word processor and a spreadsheet.

3. The computer-readable recording medium which stores the display control program according to claim 1, wherein the display control program further renders the electronic equipment to function as:

a display instruction receiver for receiving from the operator an instruction of transmissively displaying a certain number of most recently changed items among items whose respective set values are changed at a time of the switching of display, and wherein in a case of executing the switching of display, the display controller allows the items which are indicated by the instruction received by the display instruction receiver to be transmissively displayed.

4. A computer-readable recording medium which stores a display control program for rendering a display portion of an electronic equipment to display a plurality of screens, wherein the display control program renders the electronic equipment to perform a display part receiving step of receiving from an operator an instruction of specifying a predetermined part of a previously displayed screen of one application that is to be displayed transmissively to see the predetermined part of the previously displayed screen through a subsequently displayed screen of another application different from the one application when the subsequently displayed screen is displayed to overlap on the previously displayed screen;

a first display step of switching from the previously displayed screen to the subsequently displayed screen out of the plurality of screens to display the subsequently displayed screen to overlap on the previously displayed screen by the display portion; and a second display step of transmissively displaying a part of the subsequently displayed screen corresponding to the predetermined part of the previously displayed screen when the predetermined part exists at a hidden part of the previously displayed screen onto which the subsequently displayed screen overlaps in order to see the predetermined part of the previously displayed screen through the subsequently displayed screen when the subsequently displayed screen is displayed to overlap on the previously displayed screen in the first display step, and wherein the second display step displays the subsequently displayed screen without transmissively displaying any part of the previously displayed screen when the predetermined part does not exist at a hidden part of the previously displayed screen onto which the subsequently displayed screen overlaps.

5. The computer-readable recording medium which stores the display control program according to claim 4, wherein the display control program renders the electronic equipment to function in the first display step and in the second display step so screens of different applications are switched and displayed as the plurality of screens, the different applications are a word processor and a spread sheet.

6. The computer-readable recording medium which stores the display control program according to claim 4, wherein the display control program renders the electronic equipment to perform the second display step of in the case where the subsequently displayed screen includes data associated with the previously displayed screen, transmissively displaying a part corresponding to a display part of the associated data of the previously displayed screen on the subsequently displayed screen as the predetermined part.

7. The computer-readable recording medium which stores the display control program according to claim 6, wherein the display control program renders the electronic equipment to perform the second display step of transmissively displaying, on the subsequently displayed screen, the data of the previously displayed screen as the associated data, the data of the previously displayed screen being original data which is applied with a moving processing or a copying processing.

8. The computer-readable recording medium which stores the display control program according to claim 1, wherein the display control program renders the electronic equipment to function so that when a part or a peripheral part of the subsequently displayed screen on which the transmissive display is to be executed is instructed as a part on which data is to be displayed on the subsequently displayed screen, the display controller does not execute the transmissive display but gives a priority to display of data which is to be displayed on the subsequently displayed screen.

9. The computer-readable recording medium which stores the display control program according to claim 8, wherein the display control program further renders the electronic equipment to further function as:

an area specifying instruction receiver for receiving from an operator an instruction of specifying an area of a preferential display part on the subsequently displayed screen, and wherein the display controller allows the transmissive display to be not executed on an area which is indicated by the instruction received by the area specifying instruction receiver at the time of the display switching.

10. The computer-readable recording medium which stores the display control program according to claim 4, wherein the display control program renders the electronic equipment to perform the display part receiving step of receiving the display part formed of a display configuration specified by the operator as the predetermined part to be transmissively displayed.

11. The computer-readable recording medium which stores the display control program according to claim 1, wherein the display control program renders the electronic equipment to function so that when the display controller allows screens having respective priority order information to be superimposedly displayed by the display switching, and a priority order of the previously displayed screen is higher than a priority order of the subsequently displayed screen, the display controller executes the transmissive display.

12. The computer-readable recording medium which stores the display control program according to claim 11, wherein the display control program renders the electronic equipment to function as:

a priority order receiver for receiving from an operator an instruction of setting the priority orders, and wherein when the priority orders indicated by the instruction received by the priority order receiver show that the priority order of the previously displayed screen is higher than the priority order of the subsequently displayed screen at the time when the display controller allows the display switching to be performed, the display controller executes the transmissive display.

13. The computer-readable recording medium which stores the display control program according to claim 1, wherein the display control program renders the electronic equipment to function so that when a part of the subsequently displayed screen at which the transmissive display is to be executed is a predetermined part set in advance, the display controller executes the transmissive display.

14. The computer-readable recording medium which stores the display control program according to claim 1, wherein the display control program renders the electronic equipment to function so that the display controller executes the transmissive display for a predetermined time.

15. The computer-readable recording medium which stores the display control program according to claim 1, wherein the display control program renders the electronic equipment to function so that the display controller makes a display form of the transmissively displayed part to be different from other parts.

16. The computer-readable recording medium which stores the display control program according to claim 1, wherein the display control program renders the electronic equipment to function so that, in the case where a plurality of other screens are to be displayed to overlap on the currently displayed screen, the display controller allows the transmissive display parts of the plurality of other screens to be transmissively displayed in a manner such that a brightness of the transmissive display part of each screen becomes higher as the order of superimposition goes from a screen in a lower layer to a screen in a higher layer.

17. A display control device comprising:
- a display portion which displays a plurality of screens;
- a display controller which switches displays of the plurality of screens, each screen enabling an operator to change a set value of at least one item; and
- a setting change receiver that receives from the operator an instruction of changing a set value of at least one item included in a currently displayed screen when the display controller allows the display portion to display one of the plurality of screens,
- wherein the display controller determines whether the set value of one of the at least one item included in one screen is changed in accordance with the setting change instruction received by the setting change receiver when the display controller allows the display portion to display the one screen,
- the display controller allows another screen as a subsequently displayed screen to be displayed on an uppermost layer, and allows the one screen, which was displayed previously, to be hidden, and allows a part of the other screen corresponding to a display part of the item whose set value is changed most recently on the one screen to be transmissively displayed in order to see the display part of the item whose set value is changed most recently on the one screen through the other screen in the case where the one screen is switched to the another screen to be display the another screen overlapped on the one screen when the display controller determines the set value is changed,
- the display controller allows to switch from the one screen, which was displayed previously, to the other screen that is instructed to be displayed and does not allow a transmissive display in the case where the one screen is switched to the other screen to display the other screen overlapped on the one screen when the display controller determines the set value is not changed.

18. The display control device according to claim 17, wherein the display controller allows the switching of display of the plurality of screens to be performed as switching of screens of different applications, the different applications are a word processor and a spread sheet.

19. A computer-readable recording medium that stores a display control program for rendering a display control portion of an electronic equipment to display a plurality of screens, the display control program renders the electronic equipment to function as:
- a display controller that switches display of the plurality of screens, each screen enabling an operator to change a set value of at least one item; and
- a setting change receiver that receives from the operator and instruction of changing a set value of at least one item included in a currently displayed screen when the display controller allows the display portion to display one of the plurality of screens,
- wherein the display controller determines whether the set value of one of the at least one item included in one screen is changed in accordance with the setting change instruction received by the setting change receiver when the display controller allows the display portion to display the one screen,
- in a case where the one screen is switched to another screen to display the another screen overlapped on the one screen, the display controller allows a part of another screen corresponding to a display part of the item whose set value is changed most recently on the one screen to be transmissive plate displayed in order to see the display part of the item whose set value is changed most recently on the one screen through the another screen when the display controller determines the set value is changed,
- in the case where the one screen is switched to another screen to display the another screen overlap on the one screen, the display controller does not allow a transmissive display when the display controller determines the set value is not changed,
- wherein the display controller program renders the electronic equipment to function so that when a part or a peripheral part of the subsequently displayed screen on which the transmissive display is to be executed is instructed as a part on which data is to be displayed on the subsequently displayed screen, the display controller does not execute the transmissive display but gives a priority to display of data that is to be displayed on the subsequently displayed screen,
- wherein the display control program further renders the electronic equipment to function as:
- an area specifying instruction receiver for receiving from an operator and instruction of specifying an area of a preferential display part on the subsequently displayed screen, and
- wherein the display controller allows the transmissive display to be not executed on an area that is indicated by the instruction received by the area specifying instruction receiver at the time of the display switching.

* * * * *